(12) United States Patent
Roger

(10) Patent No.: US 9,522,547 B1
(45) Date of Patent: Dec. 20, 2016

(54) PRINTING SYSTEM AND METHOD THEREFOR

(71) Applicant: Royer Corporation, Madison, IN (US)

(72) Inventor: Williams Roger, Madison, IN (US)

(73) Assignee: ROYER CORPORATION, Madison, IN (US)

( * ) Notice: Subject to any disclaimer, the term of this patent is extended or adjusted under 35 U.S.C. 154(b) by 0 days.

(21) Appl. No.: 14/861,387

(22) Filed: Sep. 22, 2015

(51) Int. Cl.
*B41J 3/407* (2006.01)
*A23G 3/34* (2006.01)

(52) U.S. Cl.
CPC .............. *B41J 3/4073* (2013.01); *A23G 3/343* (2013.01)

(58) Field of Classification Search
None
See application file for complete search history.

(56) References Cited

U.S. PATENT DOCUMENTS

| | | | |
|---|---|---|---|
| 5,784,171 A * | 7/1998 | Kano | B41J 2/01 347/3 |
| 8,733,868 B1 * | 5/2014 | Polk | B41J 3/4075 347/101 |
| 9,114,645 B2 * | 8/2015 | Gerber | B41J 3/407 |
| 9,156,293 B2 * | 10/2015 | Gerber | B41J 3/407 |
| 2009/0295143 A1 * | 12/2009 | Flynn | B42D 15/045 283/81 |
| 2010/0182368 A1 * | 7/2010 | Matsui | A63B 45/02 347/16 |
| 2010/0186610 A1 * | 7/2010 | Polk | B41J 3/4073 101/35 |
| 2013/0334010 A1 * | 12/2013 | Gerber | B65D 1/36 198/465.1 |
| 2015/0210086 A1 * | 7/2015 | Onodera | B41J 3/4073 347/104 |

* cited by examiner

*Primary Examiner* — Justin Seo
(74) *Attorney, Agent, or Firm* — Benesch, Friedlander, Coplan & Aronoff LLP

(57) ABSTRACT

A board for retaining three dimensional decorations in a printer is provided. The board includes a first surface and a second surface that is opposite the first surface. A plurality of openings extends from the first surface to the second surface. The openings are configured to retain a flange portion of the three dimensional decoration so that a decorative portion of the three dimensional decoration rests on the first surface.

18 Claims, 5 Drawing Sheets

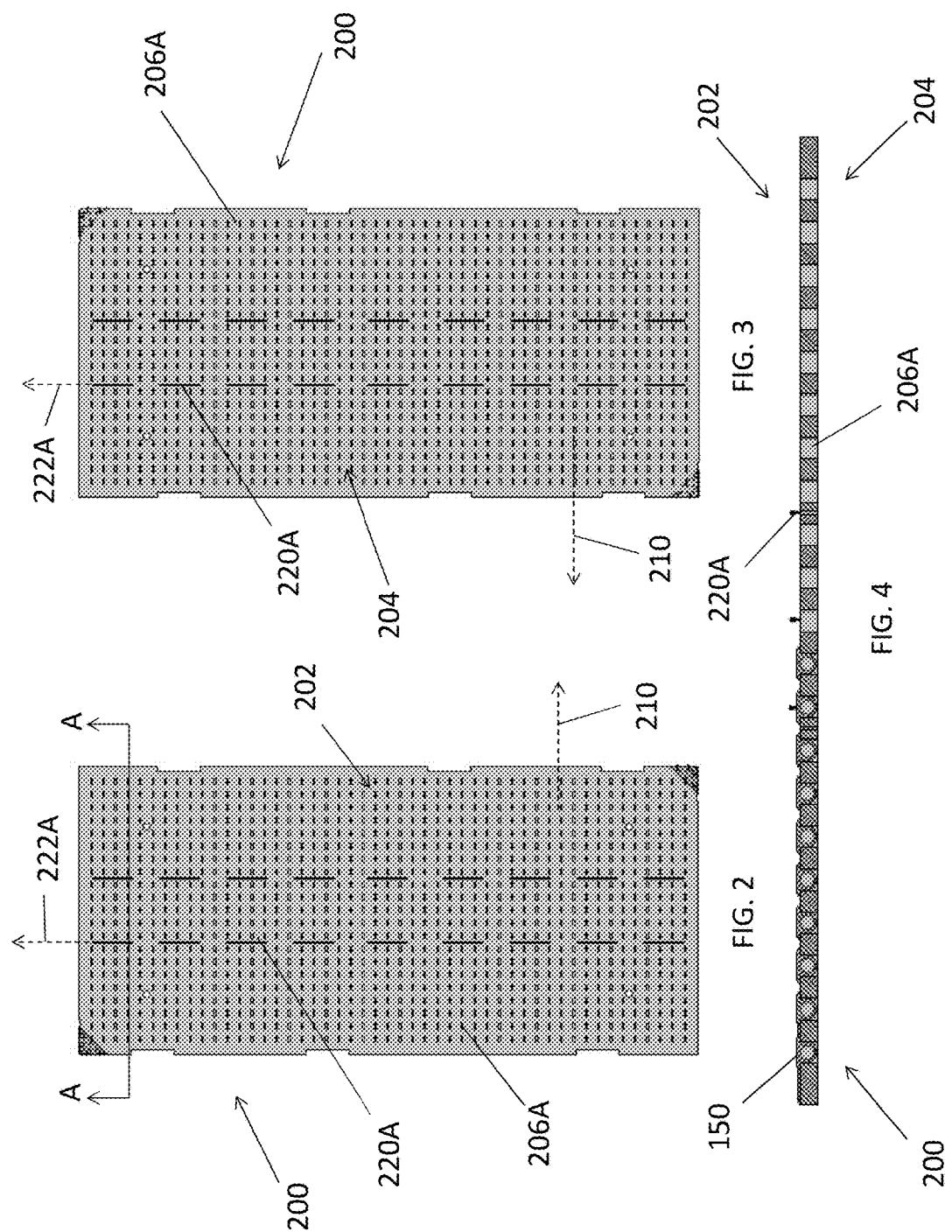

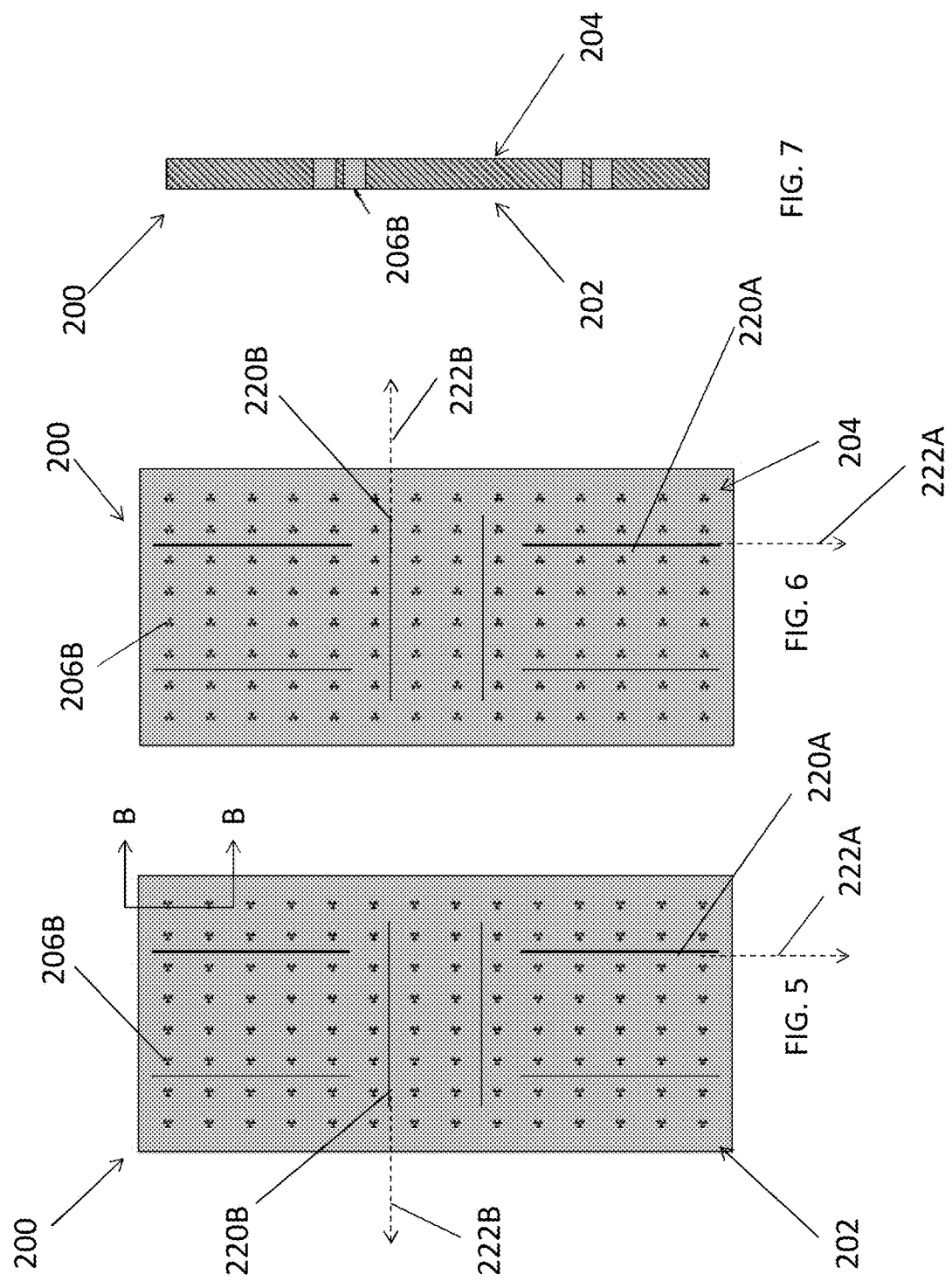

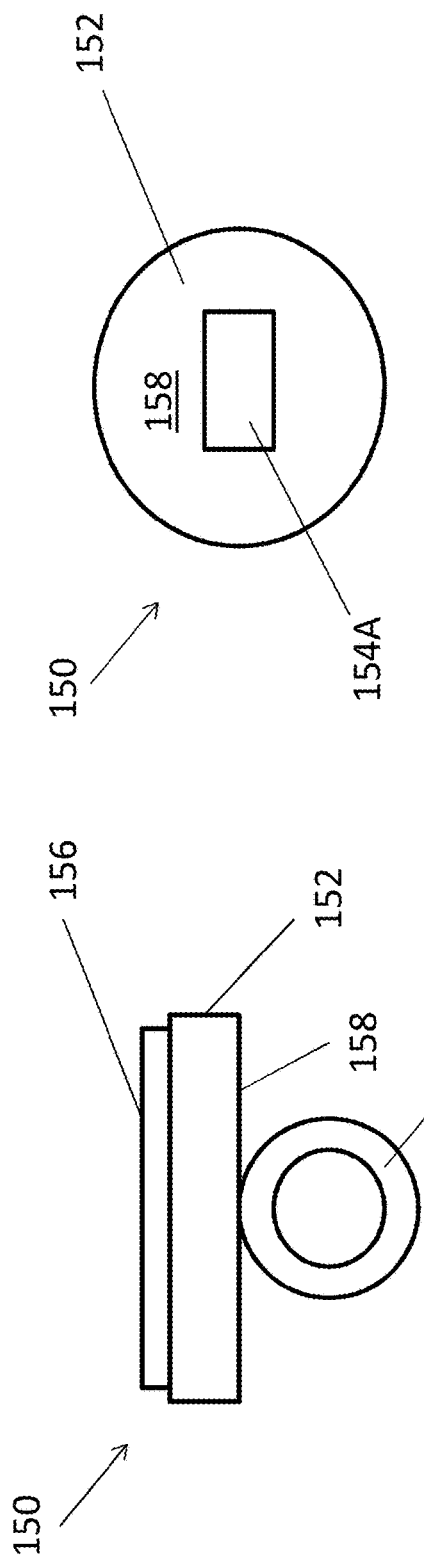
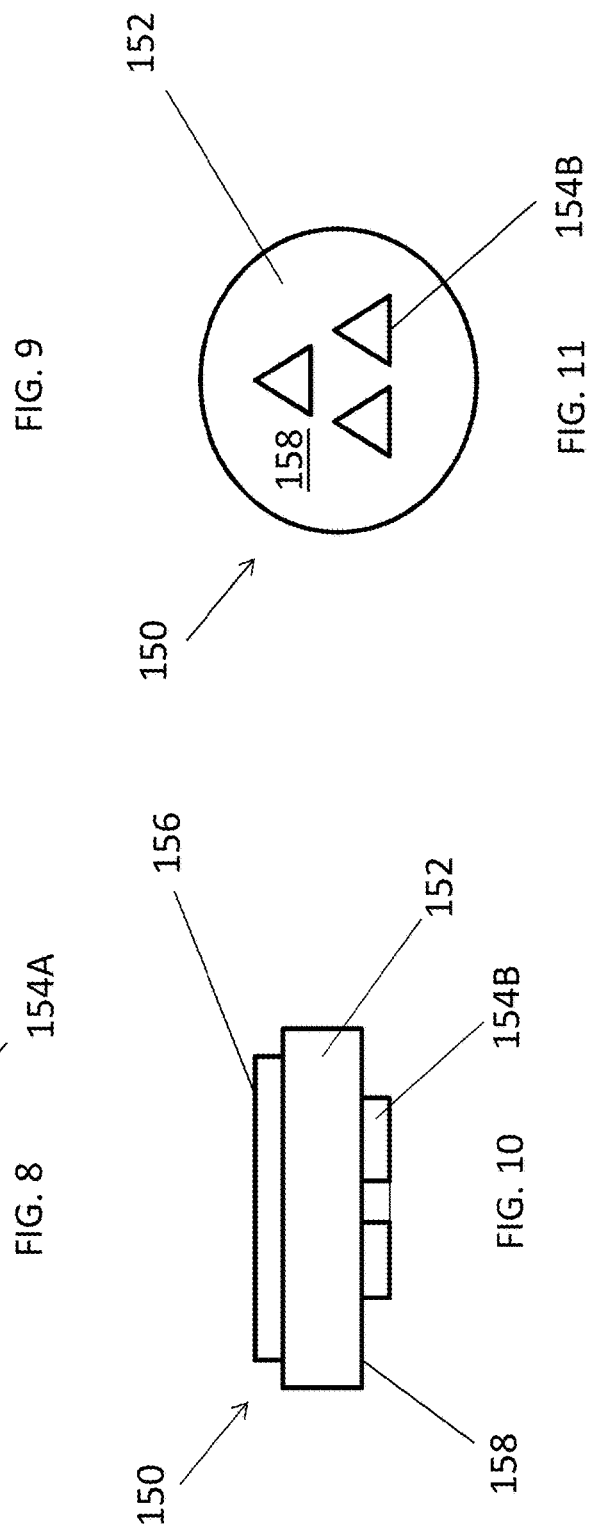

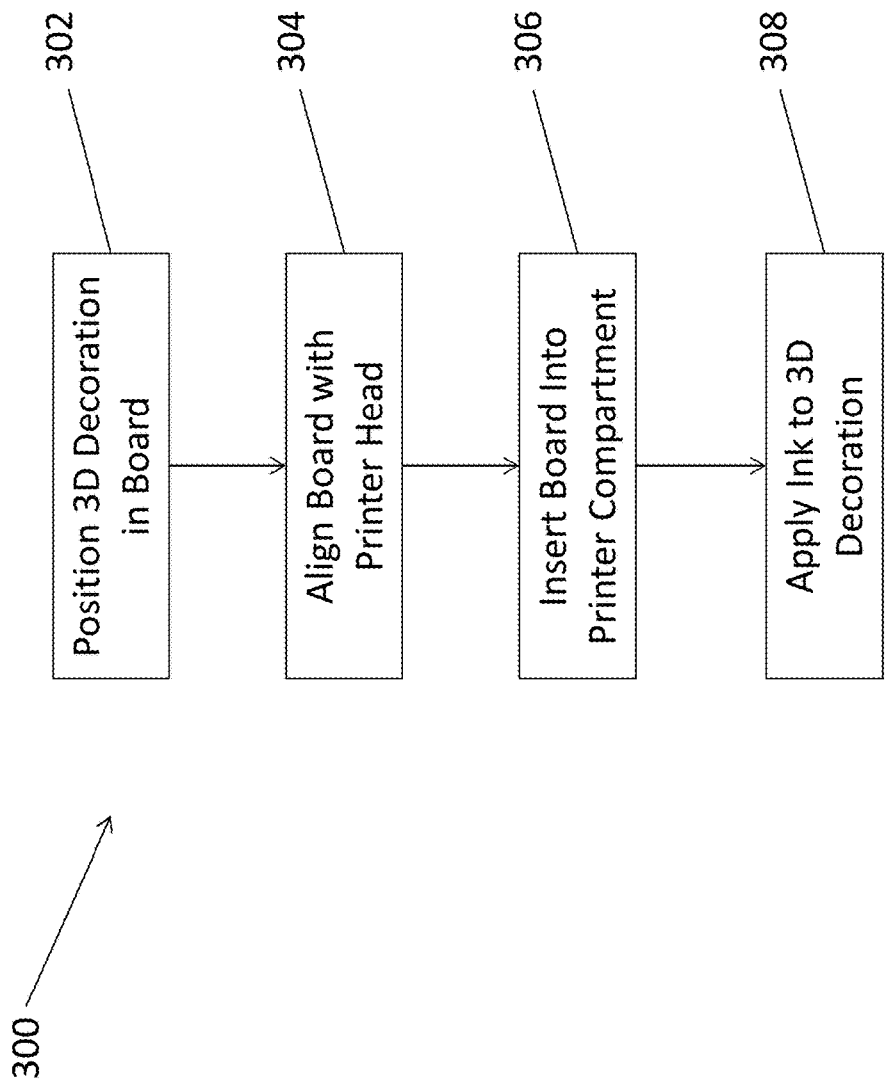

PRINTING SYSTEM AND METHOD THEREFOR

TECHNICAL FIELD OF THE DISCLOSED EMBODIMENTS

The disclosed embodiments relate generally to printing and, more particularly, to printing on three dimensional decorations.

BACKGROUND OF THE DISCLOSED EMBODIMENTS

Baked goods, such as cakes and cupcakes, typically have decorations thereon. Generally, the decorations consist of plastic three-dimensional cake toppers. These decorations are formed through a molding process to give the decoration its shape. The decoration is then painted to provide multiple colors on the surface of the decoration. Unfortunately, the painting process is typically performed through spray painting. This process can be time consuming as each decoration may be required to be individually painted. Additionally, such spray painting processes may waste substantial amounts of paint. As another drawback, spray painting is not always precise, causing the paint on the decoration to be uneven.

A need remains for a printing process for printing on three dimensional decorations.

SUMMARY OF THE DISCLOSED EMBODIMENTS

In one aspect, a board for retaining three dimensional decorations in a printer is provided. The board includes a first surface and a second surface that is opposite the first surface. A plurality of openings extends from the first surface to the second surface. The openings are configured to retain a flange portion of the three dimensional decoration so that a decorative portion of the three dimensional decoration rests on the first surface.

In a further aspect of the above, the plurality of openings are formed as slots.

In a further aspect of any of the above, a longitudinal axis of each slot extends substantially perpendicular to a path of a printer head within the printer.

In a further aspect of any of the above, the plurality of openings are configured as triangles.

In a further aspect of any of the above, the board is constructed and arranged to be received in an ink jet printer.

In a further aspect of any of the above, the board is formed from PVC foam board.

In a further aspect of any of the above, at least one stress relief slot is formed thru the first surface extending to the second surface.

In a further aspect of any of the above, a longitudinal axis of at least one first stress relief slot extends substantially parallel to a path of a printer head within the printer; and a longitudinal axis of at least one second stress relief slot extends substantially perpendicular to a path of the printer head within the printer In another aspect, a method of printing on three dimensional decorations in a printer is provided. The method includes positioning a plurality of three dimensional decorations in openings formed in a first surface of a board. The method also includes aligning the board with a printer head of the printer. The method also includes inserting the board into the printer so that the printer may print on a surface of the three dimensional decorations.

In a further aspect of the above, method also includes positioning the plurality of three dimensional decorations in the openings so that a flange portion of each three dimensional decoration is positioned within the opening and a decorative portion of each three dimensional decoration rests on the first surface. The method also includes printing on the decorative portion of each three dimensional decoration.

In a further aspect of any of the above, the method also includes positioning the plurality of three dimensional decorations in slots formed in the board.

In a further aspect of any of the above, the method also includes positioning the plurality of three dimensional decorations in at least one triangle formed in the board.

In a further aspect of any of the above, the method also includes positioning the plurality of three dimensional decorations so that a longitudinal axis of a flange of the three dimensional decoration extends substantially perpendicular to a path of the printer head.

In a further aspect of any of the above, the method also includes positioning the plurality of three dimensional decorations in a board having at least one stress relief slot formed therethrough.

In one aspect, a three dimensional decoration is provided that is formed by the process of positioning a plurality of three dimensional decorations in openings formed in a first surface of a board. The process also includes aligning the board with a printer head of the printer. The process also includes inserting the board into the printer so that the printer may print on a surface of the three dimensional decorations.

In a further aspect of the above, the process also includes positioning the plurality of three dimensional decorations in the openings so that a flange portion of each three dimensional decoration is positioned within the opening and a decorative portion of each three dimensional decoration rests on the first surface. The process also includes printing on the decorative portion of each three dimensional decoration.

In a further aspect of any of the above, the process also includes positioning the plurality of three dimensional decorations in slots formed in the board.

In a further aspect of any of the above, the process also includes positioning the plurality of three dimensional decorations in at least one triangle formed in the board.

In a further aspect of any of the above, the process also includes positioning the plurality of three dimensional decorations so that a longitudinal axis of a flange of the three dimensional decoration extends substantially perpendicular to a path of the printer head In a further aspect of any of the above, the process also includes positioning the plurality of three dimensional decorations in a board having at least one stress relief slot formed therethrough.

BRIEF DESCRIPTION OF THE DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein:

FIG. 2 is a top view of a board in accordance with an embodiment.

FIG. 3 is a bottom view of the board shown in FIG. 2.

FIG. 4 is a cross-sectional view of the board shown in FIG. 2 taken across line A-A.

FIG. 5 is a top view of a board in accordance with an embodiment.

FIG. 6 is a bottom view of the board shown in FIG. 5.

FIG. 7 is a cross-sectional view of the board shown in FIG. 5 taken across line B-B.

FIG. 8 is a side view of a three dimensional decoration in accordance with an embodiment.

FIG. 9 is a bottom view of the three dimensional decoration shown in FIG. 8.

FIG. 10 is a side view of a three dimensional decoration in accordance with an embodiment.

FIG. 11 is a bottom view of the three dimensional decoration shown in FIG. 10.

FIG. 12 illustrates a method for forming a three dimensional decoration in accordance with an embodiment.

DETAILED DESCRIPTION OF THE DISCLOSED EMBODIMENTS

Figure 1:
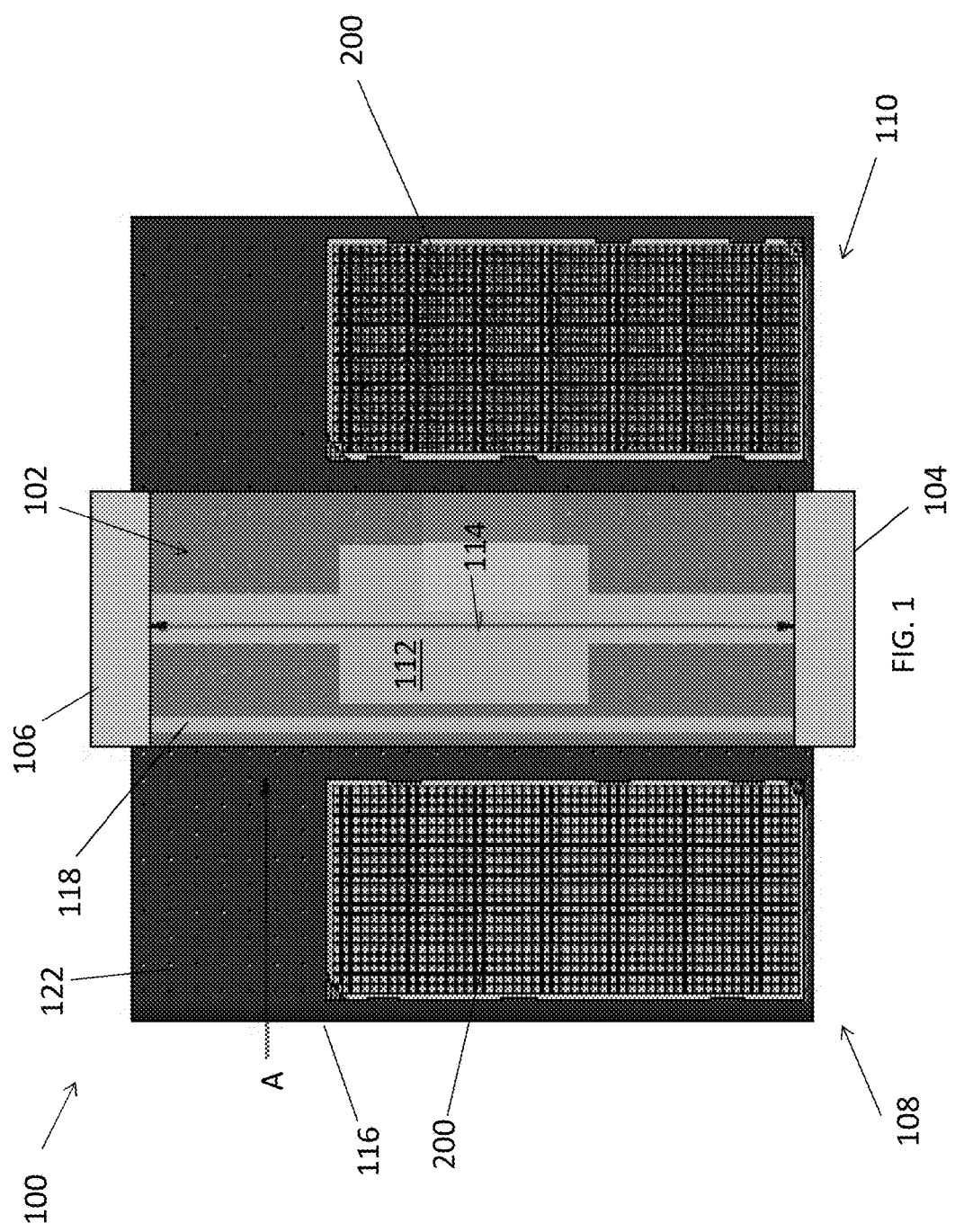
FIG. 1 is a top sectional view of a printer in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a printer 100 that may be used for printing on three dimensional decorations, in one embodiment. In one embodiment, the printer 100 may be an ink jet printer. The printer 100 includes a printing compartment 102 that receives an object to be printed, for example the board 200 shown in FIGS. 2-7. The printing compartment 102 includes a first end 104 and a second end 106. An entry side 108 and an exit side 110 extend between the first end 104 and the second end 106. A printer head 112 is provided within the printing compartment 102. In one embodiment, the printer head 112 may be an ink jet printer head. Other printer heads may be contemplated. The printer head 112 travels along a printer head path 114 to print on the object positioned within the printing compartment 102. In one embodiment, the printer head path 114 is defined between the first end 104 and the second end 106. In one embodiment, the printer head path 114 is substantially parallel to the entry side 108 and the exit side 110. In one embodiment, the printer head path 114 is substantially perpendicular to the entry side 108 and the exit side 110.

A belt 116 that extends from the entry side 108 to the exit side 110 through the printing compartment 102 is provided. The object to be printed may be positioned on the belt 116, so that the object may be moved into the printing compartment 102 in the direction of arrow A. At least one sensor 118 confirms that the object to be printed is aligned with the printing compartment 102. The at least one sensor 118 may also align the object to be printed with the printer head 112 and the path of the printer head 114. The belt 116 includes apertures 122 therethrough. While in the printing compartment 102, a vacuum is applied through the apertures 122 to provide suction on the object to be printed and secure the object to be printed to the belt 116. After the object to be printed passes through the printing compartment 102, the object to be printed is moved via the belt 116 to the exit side 110 of the printing compartment 102.

FIGS. 8-11 illustrate a three dimensional decoration 150 having a decorative portion 152 and a flange portion 154. The decorative portion 152 is configured to be printed on by the printer 100. In particular, the decorative portion 152 includes a top surface 156 to be printed on. The top surface 156 may include a three-dimensional design. The decorative portion 152 includes a bottom surface 158 that is opposite the top surface 156. The flange portion 154 extends from the bottom surface 158. In one embodiment, as illustrated in FIGS. 8-9, a flange portion 154A may be a ring. In one embodiment, as illustrated in FIGS. 10-11, a flange portion 154B may be at least one triangle. In the illustrated embodiment, the at least one triangle 154B includes a plurality of triangles 154B in a triangular pattern. Other patterns or shapes may be contemplated.

FIGS. 2-7 illustrate a board 200 constructed and arranged to be used with the printer 100 to print on three dimensional decorations, for example, the three dimensional decorations 150 illustrated in FIGS. 8-11. In one embodiment, the board 200 is constructed and arranged to be placed on the belt 116 and inserted into the printing compartment 102, where the board is held to the belt 116 via the vacuum. After printing, the board 200 exits to the exit side 110 of the printer 100. In one embodiment, the board 200 is formed from PVC foam board to prevent warping or displacement of the board 200 while the board 200 is in the printing compartment 102. In one embodiment, the board 200 is approximately 19 mm thick, approximately 48 inches wide, and approximately 96 inches long. In one embodiment, the board 200 is configured to hold a plurality of three dimensional decorations 150, so that the printer head 112 may apply ink to the top surface 156 of the three dimensional decoration 150. The board 200 includes a first side 202 and an opposite second side 204. The second side 204 is constructed and arranged to be positioned on and suctioned to the belt 116. The first side 202 is configured to be positioned face up so that the printer head 112 moves along the first side 202 of the board 200 during printing.

A plurality of openings 206 are formed through the board 200, extending from the first side 202 to the second side 204. In one embodiment, the openings 206 may only be formed through the first side 202 of the board 200. The openings 206 are constructed and arranged to retain the flange portion 154 of the three dimensional decoration 150. The decorative portion 152 of the three dimensional decoration 150 is configured to rest on the first side 202 of the board 200 with the top surface 156 facing upward.

In the embodiment illustrated in FIGS. 2-4, openings 206A are formed as slots that are constructed and arranged to retain the flange portion 154A of the three dimensional decoration 150. The slots 206A have a longitudinal axis 210 that extends substantially perpendicular to the path of the printer head 114, when the board 200 is positioned within the printing compartment 102. In the embodiment illustrated in FIGS. 5-7, openings 206B are formed as triangles to retain the flange portions 154B of the three dimensional decoration 150. In one embodiment, the triangles 206B may be formed in a triangular pattern. Other patterns may be contemplated.

In one embodiment, stress relief slots 220 may be provided thru the first side 202 to the second side 204 of the board 200. The stress relief slots 220 may reduce warping in the board 200, when the board 200 is inserted into printing compartment 102 and suctioned to the belt 116. In one embodiment, at least one of the stress relief slots 220A has a longitudinal axis 222A that extends substantially parallel to the path of the printer head 114, when the board 200 is positioned within the printing compartment 102. In one embodiment, the longitudinal axis 222A of the stress relief slots 220A extends substantially perpendicular to the longitudinal axes 210 of the slots 208. In one embodiment, at least one of the stress relief slots 220B has a longitudinal axis 222B that extends substantially perpendicular to the path of the printer head 114, when the board 200 is positioned within the printing compartment 102. In one embodiment, the longitudinal axis 222B of the stress relief slots 220B extends substantially parallel to the longitudinal axes 210 of the slots 208. In one embodiment, the stress relief slots 220 are segmented along the length or width of the board 200.

In one embodiment, tape may be applied to the first surface 202 of the board 200. In one embodiment, the tape may be masking tape. In one embodiment, the tape is removable from the first side 202 of the board, so that excess ink may be removed from the first side 202 of the board 200.

FIG. 12 illustrates a method and process 300 for creating three dimensional decorations via printing in the printer 100. At step 302, at least one three dimensional decoration 150 is positioned in an opening 206 of the board 200. In one embodiment, a plurality of three dimensional decorations 150 is positioned in a plurality of openings 206 formed in the board 200. In particular, the flange portion 154 of the three dimensional decoration 150 is positioned in the opening 206 so that the decorative portion 152 of the three dimensional decoration 150 is positioned on the first side 202 of the board with the top surface 156 facing upward. In one embodiment, a ring 154A of the three dimensional decoration 150 is positioned in a slot 206A formed in the board 200. In one embodiment, at least one triangle 154B of the three dimensional decoration is positioned in at least one triangle 206B formed in the board 200.

At step 304, the board 200 is aligned with the printer head 112 of the printer 100. Proper alignment of the board 200 may be confirmed by the at least one sensor 118. At step 306, the board 200 is inserted into the printing compartment 102 and secured to the belt 116 via suction. At step 308, the printer head 112 travels along the path of the printer head 114 to apply ink to the top surface 156 of the three dimensional decoration 150. In one embodiment using an ink jet printer, the ink jets may be programmed to adjust for the three dimensional shape of the three dimensional decoration 150. After the printing process is completed, the board 200 exits the printing compartment.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. A board for retaining three dimensional decorations in a printer; the board comprising:
   a first surface;
   a second surface opposite the first surface; and
   a plurality of openings extending from the first surface to the second surface, the openings configured to retain a flange portion of the three dimensional decoration so that a decorative portion of the three dimensional decoration rests on the first surface.

2. The board of claim 1, wherein the plurality of openings are formed as slots.

3. The board of claim 2, wherein a longitudinal axis of each slot extends substantially perpendicular to a path of a printer head within the printer.

4. The board of claim 1, wherein the plurality of openings are configured as triangles.

5. The board of claim 1, wherein the board is constructed and arranged to be received in an ink jet printer.

6. The board of claim 1, wherein the board is formed from PVC foam board.

7. The board of claim 1 further comprising at least one stress relief slot formed thru the first surface extending to the second surface.

8. The board of claim 7, wherein:
   a longitudinal axis of at least one first stress relief slot extends substantially parallel to a path of a printer head within the printer; and
   a longitudinal axis of at least one second stress relief slots extends substantially perpendicular to a path of the printer head within the printer.

9. A method of printing on three dimensional decorations in a printer, the method comprising:
   positioning a plurality of three dimensional decorations in openings formed in a first surface of a board;
   aligning the board with a printer head of the printer;
   inserting the board into the printer so that the printer may print on a surface of the three dimensional decorations;
   positioning the plurality of three dimensional decorations in the openings so that a flange portion of each three dimensional decoration is positioned within the opening and a decorative portion of each three dimensional decoration rests on the first surface;
   and printing on the decorative portion of each three dimensional decoration.

10. The method of claim 9, wherein positioning the plurality of three dimensional decorations in the openings further comprises positioning the plurality of three dimensional decorations in slots formed in the board.

11. The method of claim 9, wherein positioning the plurality of three dimensional decorations in the openings further comprises positioning the plurality of three dimensional decorations in at least one triangle formed in the board.

12. The method of claim 9, wherein positioning the plurality of three dimensional decorations in the openings further comprises positioning the plurality of three dimensional decorations so that a longitudinal axis of a flange of the three dimensional decoration extends substantially perpendicular to a path of the printer head.

13. The method of claim 9 further comprising positioning the plurality of three dimensional decorations in a board having at least one stress relief slot extending therethrough.

14. A three dimensional decoration formed by the process of:
   positioning a plurality of three dimensional decorations in openings formed in a first surface of a board;
   aligning the board with a printer head of the printer;
   inserting the board into the printer so that the printer may print on a surface of the three dimensional decorations;
   positioning the plurality of three dimensional decorations in the openings so that a flange portion of each three dimensional decoration is positioned within the opening and a decorative portion of each three dimensional decoration rests on the first surface;
   and printing on the decorative portion of each three dimensional decoration.

15. The three dimensional decoration of claim 14, wherein the process further comprises positioning the plurality of three dimensional decorations in slots formed in the board.

16. The three dimensional decoration of claim 14, wherein the process further comprises positioning the plurality of three dimensional decorations in at least one triangle formed in the board.

17. The three dimensional decoration of claim 14, wherein the process further comprises positioning the plurality of three dimensional decorations so that a longitudinal axis of a flange of the three dimensional decoration extends substantially perpendicular to a path of the printer head.

18. The three dimensional decoration of claim 14, wherein the process further comprises positioning the plurality of three dimensional decorations in a board having at least one stress relief slot formed therethrough.

\* \* \* \* \*